(No Model.)

T. J. TERRY.
OPEN LINK.

No. 293,817. Patented Feb. 19, 1884.

Attest:
Charles Pickles
Wm. F. Sayers

Inventor:
Thos. J. Terry
By Knight Bros
Attys

UNITED STATES PATENT OFFICE.

THOMAS J. TERRY, OF ASHLAND, MISSOURI.

OPEN LINK.

SPECIFICATION forming part of Letters Patent No. 293,817, dated February 19, 1884.

Application filed June 26, 1883. (No model.)

*To all whom it may concern:*

Be it known that I, THOMAS J. TERRY, of Ashland, in the county of Boone and State of Missouri, have invented an Improved Split and Open Link, of which the following is a specification.

My invention relates to those links which are partly split at one end and are opened at one side for the insertion of the eye of the device to be connected thereto.

My invention consists in a peculiar construction of such link, as hereinafter described and specifically claimed.

In order that the invention may be fully understood, I will proceed to describe it with reference to the accompanying drawings, in which—

Figure 1:
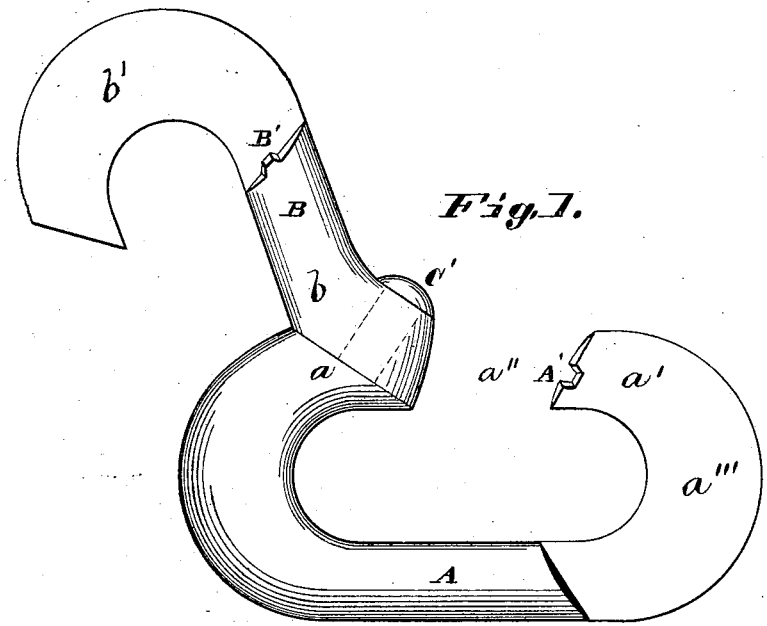
Figure 2:
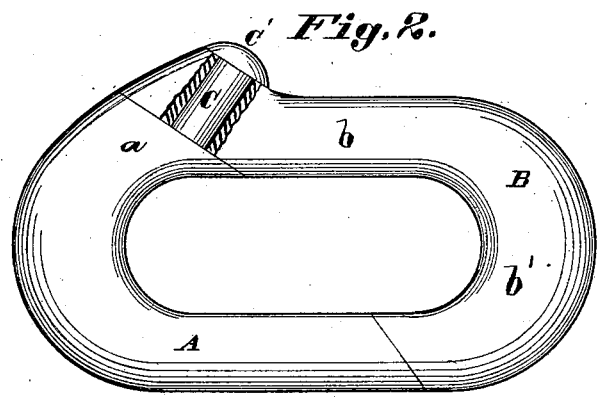
Figure 3:
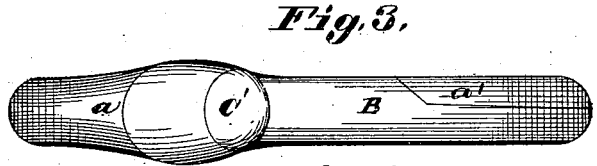
Figure 4:

Figure 1 is a view of my improved link in elevation, the hinged part being turned away from the body of the link for the reception of the device to be connected thereto. Fig. 2 is a similar view of the link closed and partly in section to exhibit the oblique pivot-pin. Fig. 3 is a view of the edge from the pivot side. Fig. 4 is a view of the opposite edge.

A is the body of the link, and B a part hinged to the body.

C is an oblique pivot-pin at and inclined toward one side of and in the plane of the link to support the hinged part entirely out of the way when the link is open. The hinged part is secured to the body by a head, C', on the pivot-pin. The body A is formed with return-bends $a\ a'$, leaving an entrance, $a''$, for the device to be connected. The opposite end of the link to the pivot is formed with a flattened end, $a'''$, to fit the flattened end $b'$ of the hinged part, whose body $b$ closes the opening to the link. The return-bend $a'$ has a notch or recess, A', to receive a lug or projection, B', on the body of the hinged part. It will thus be seen that the hinged part B and the body A fit snugly together, providing smooth ends to the link. The two return-bends make the link much better, as the connected link at the pivot end would not rub against the part B at the pivot. My pivot C is inclined, so as to make only a small rounded projection upon the side of the link near its mid-length, and the bearing-faces of the parts being at right angles to the pin a broad bearing is given to prevent the parts from being strained out of position. The projection B' and notch A' are an element of strength preventing the lateral displacement of the parts and fracture of the hinge.

In my link I combine the advantages of a side pivot and a split separable end.

My preferred manner of manufacturing the link is to cast the part A and pivot-pin with head in one piece. Then dip the pin in some adhesive liquid or material, and coat it with sand. These parts are then placed in a suitable mold, and the part B cast upon the pin, and when the whole is taken out of the mold and the part B turned on the pin the fine sand which was caused to adhere to the pin will leak out, leaving the desired loose joint.

The link can thus be manufactured very cheaply, and with its general construction it is strong and durable.

Having thus described my invention, the following is what I claim as new therein and desire to secure by Letters Patent—

A split and open link consisting of a body, A, having a return-bend, $a$, a flattened end, $a'''$, return-bend, $a'$, having notch A', and pivot-pin C, having head C', and the part B, hinged to the pivot-pin, having flattened end $b'$, and projection B', fitting the flattened end and recess in the body, as set forth.

THOMAS J. TERRY.

In presence of—
GEO. H. KNIGHT,
SAML. KNIGHT.